United States Patent
Berge

[15] 3,680,525
[45] Aug. 1, 1972

[54] PROGRAM DISPLAY DEVICE

[72] Inventor: Arthur Berge, Wennerbergsgatan 6, Stockholm, Sweden

[22] Filed: Aug. 26, 1970

[21] Appl. No.: 66,624

Related U.S. Application Data

[63] Continuation of Ser. No. 577,108, Aug. 29, 1966, abandoned.

[52] U.S. Cl. ..........................116/135, 35/76, 40/65
[51] Int. Cl. .............................................G09f 9/00
[58] Field of Search .116/131, 135, 136; 35/24, 24.4, 35/75, 76; 40/64, 65

[56] References Cited

UNITED STATES PATENTS

| | | | |
|---|---|---|---|
| 2,703,548 | 3/1955 | Mackintosh | 116/135 |
| 2,722,070 | 11/1955 | Thompson | 116/135 |
| 2,829,456 | 4/1958 | Hutterer | 40/65 |
| 2,884,713 | 5/1959 | Campbell | 116/135 |
| 3,270,709 | 9/1966 | Berge | 116/135 |

FOREIGN PATENTS OR APPLICATIONS

| | | | |
|---|---|---|---|
| 115,803 | 8/1942 | Great Britain | 116/131 |
| 1,130,083 | 1/1957 | France | 116/135 |
| 117,011 | 10/1926 | Switzerland | 35/24.4 |
| 75,066 | 8/1932 | Sweden | 116/135 |

*Primary Examiner*—Louis J. Capozi
*Attorney*—Kurt Kelman

[57] ABSTRACT

A program and its progress are displayed on a rectangular display board. The program is constituted by at least three program factors and one of these factors is common to all the other factors. A plurality of tracks on the board extend parallel to one coordinate axis and each track carries slidable indicators displaying indicia indicating an interrelationship between the other program factors, with each track associated with one such other program factor. There is a display of sequentially arranged indicia indicating units of the one program factor, with the units defining a dimension parallel to the coordinate axis perpendicular to the one axis. Each indicator is of the same width as each unit for alignment with a respective unit along a respective perpendicular axis. A plurality of elongated indexing members are positionable on the board across the tracks in alignment with selected units.

9 Claims, 15 Drawing Figures

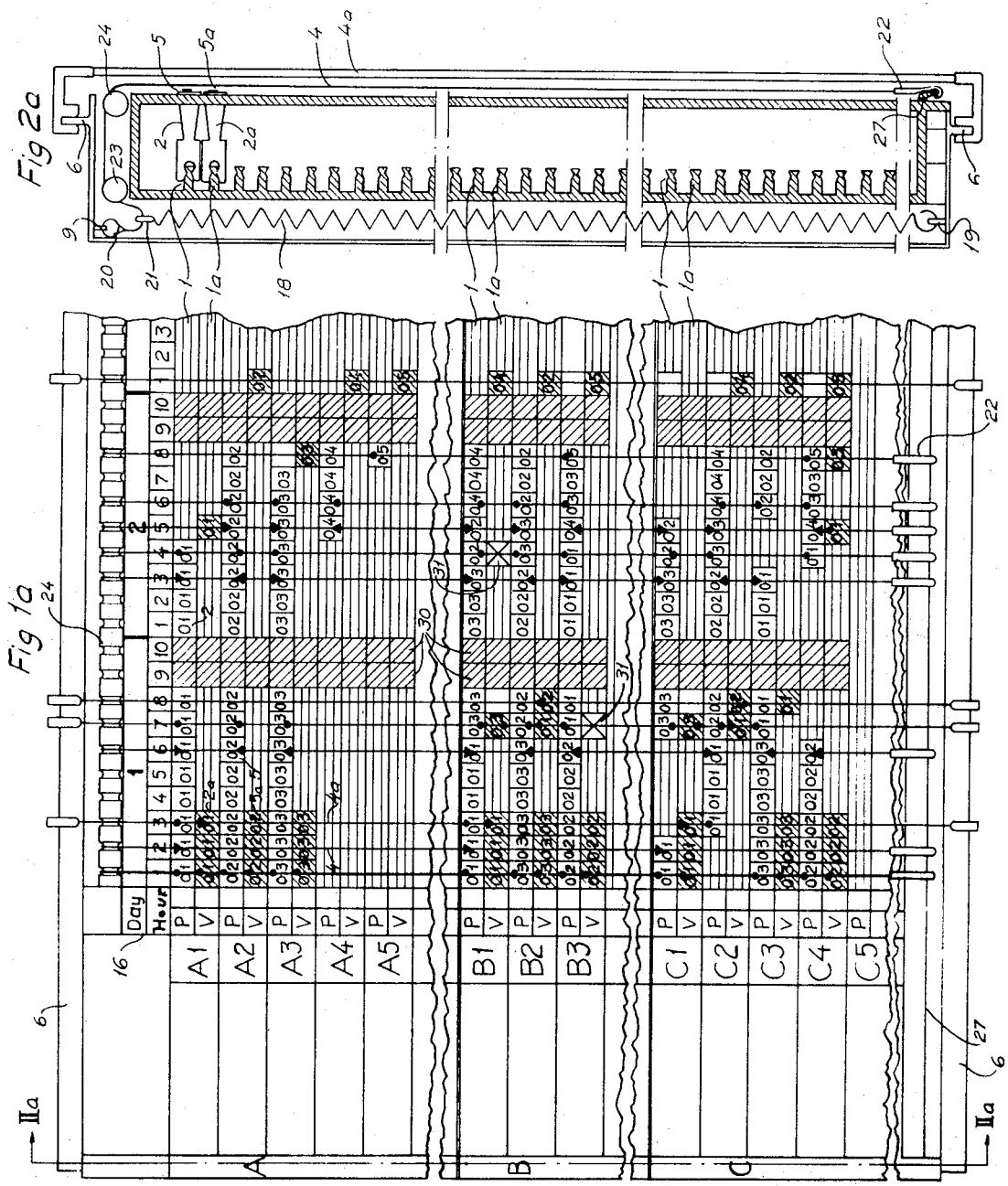

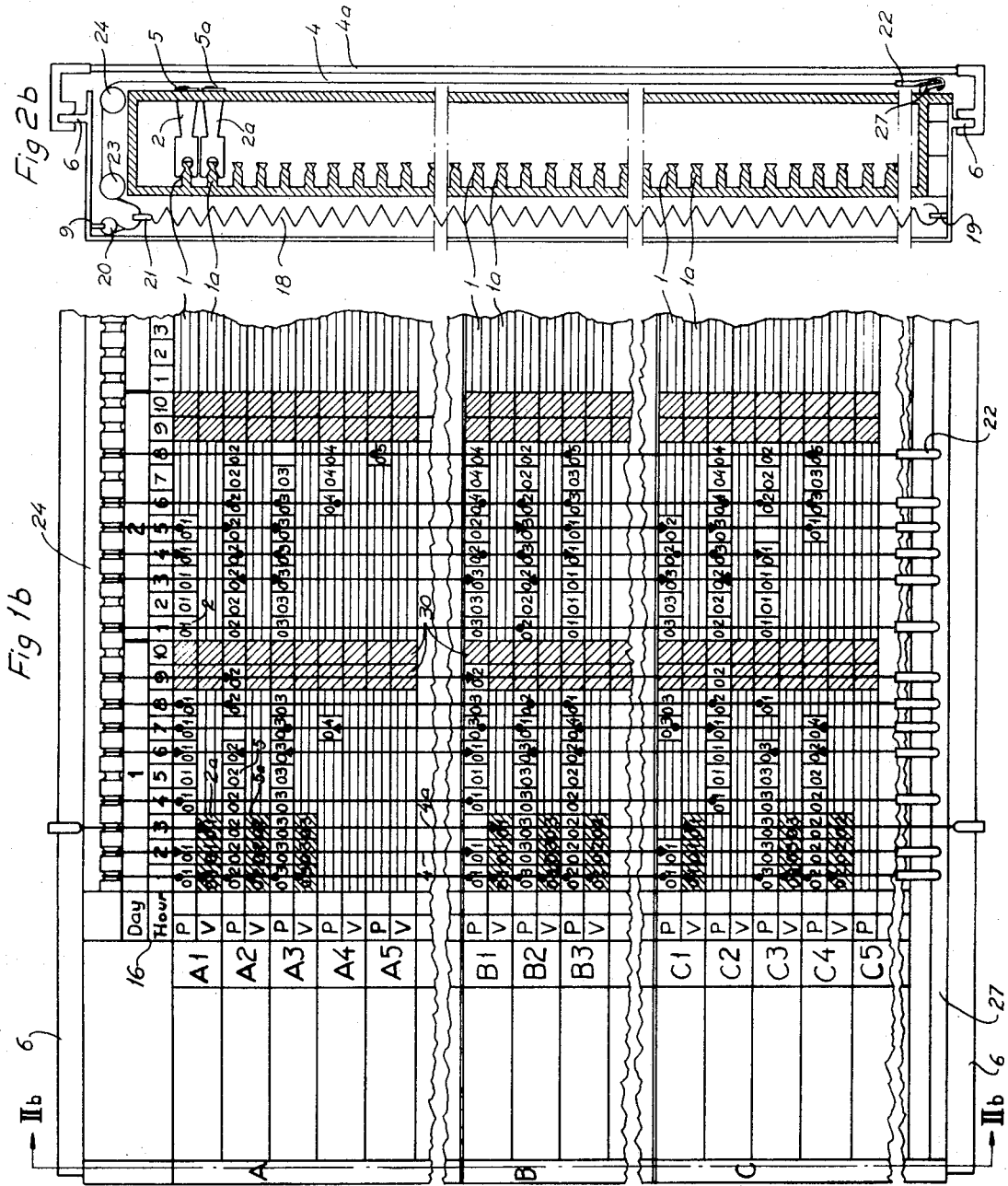

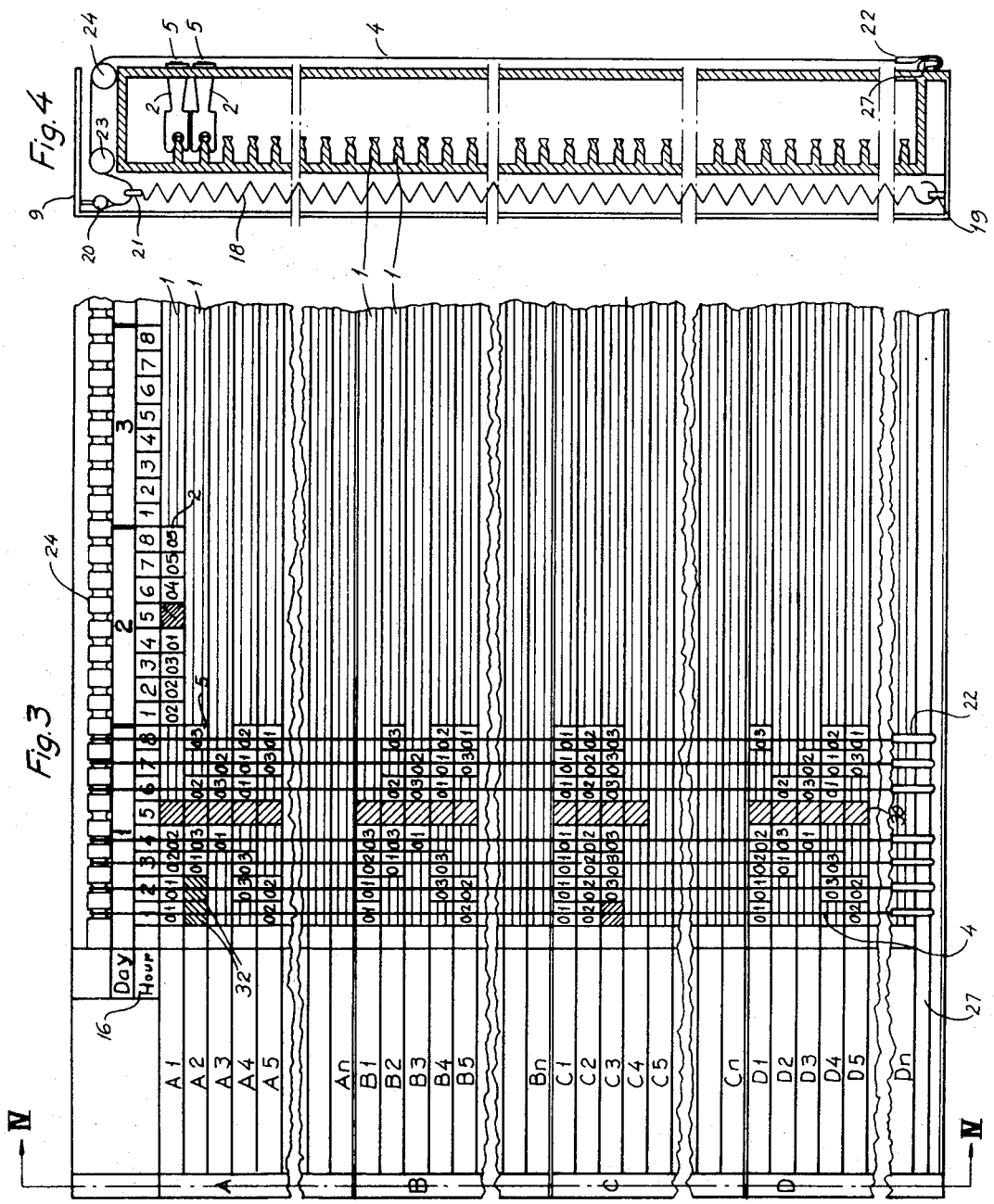

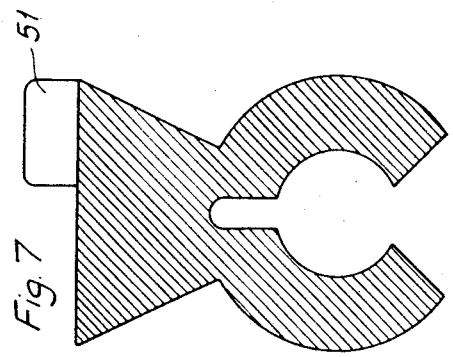
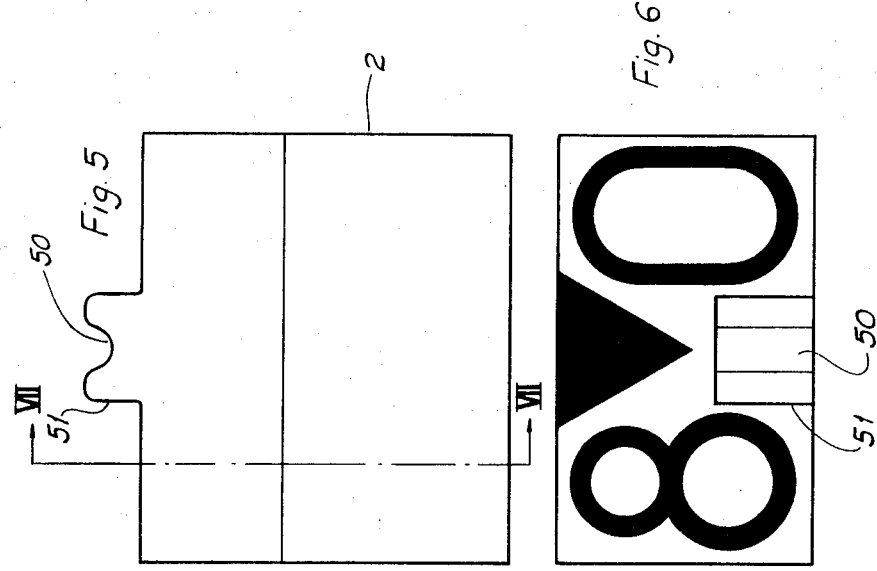

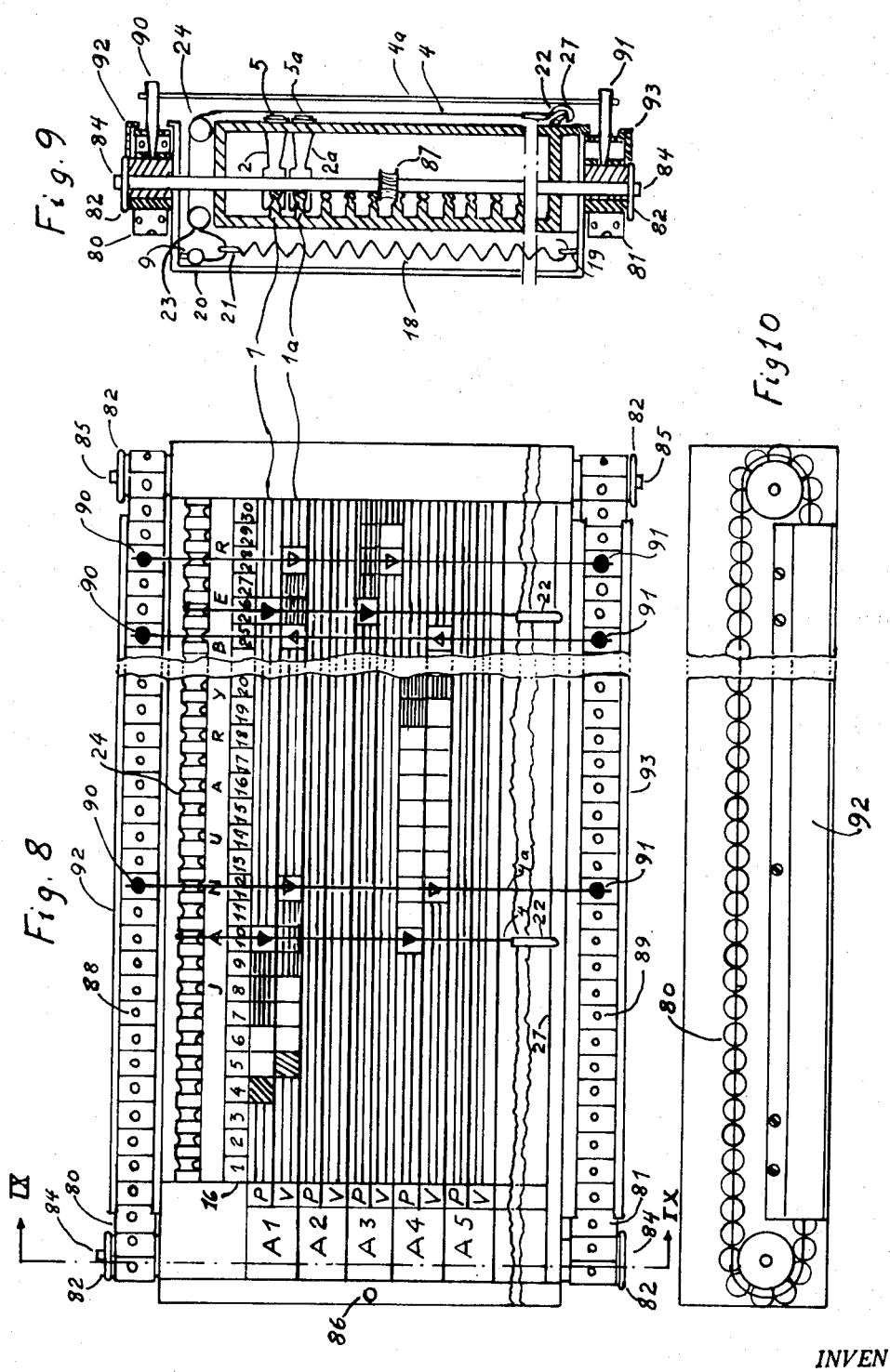

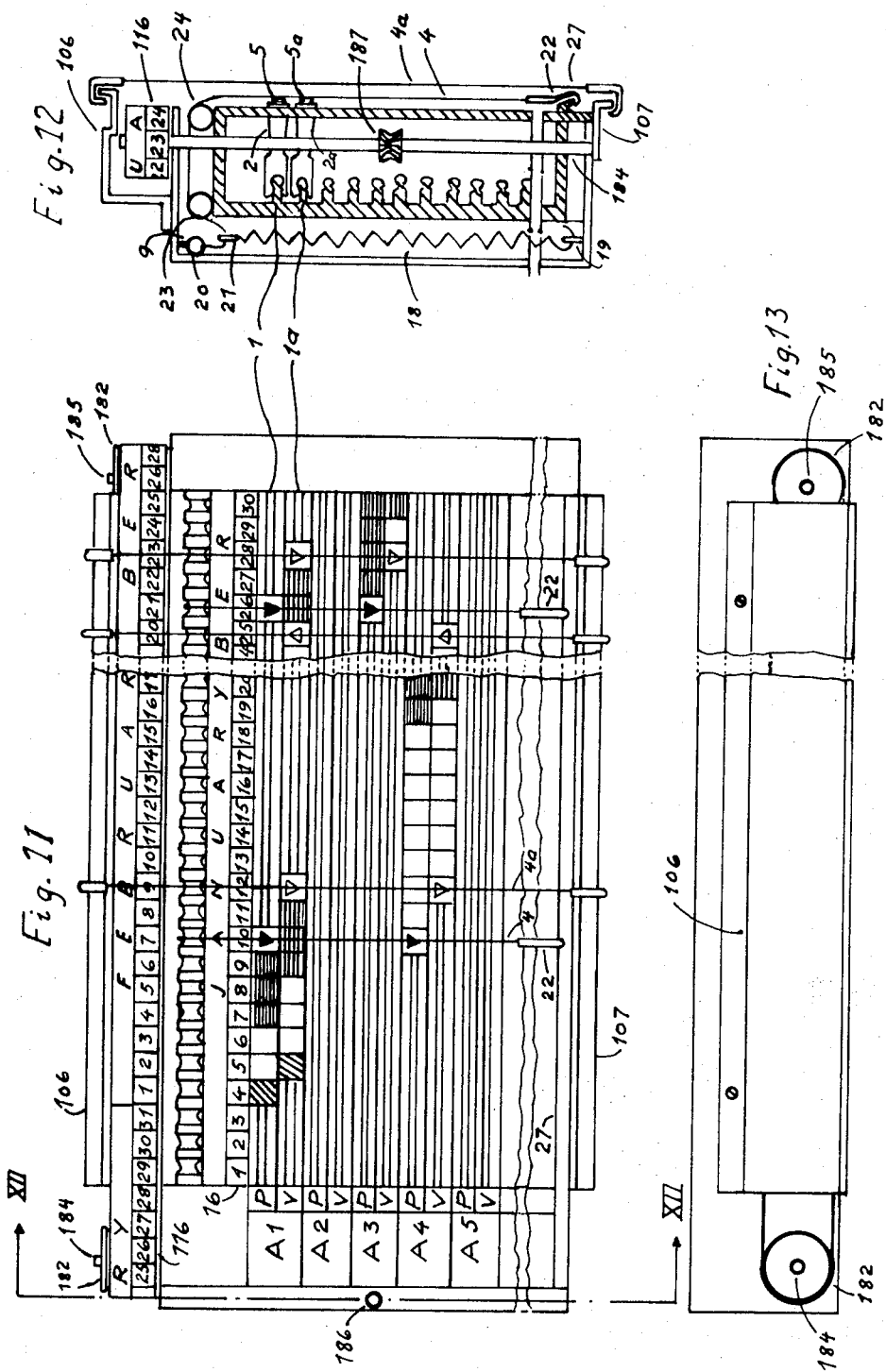

PROGRAM DISPLAY DEVICE

REFERENCE TO COPENDING APPLICATION

The present application is a continuation of my copending application Ser. No. 577,108, filed Aug. 29, 1966 now abandoned.

BACKGROUND OF THE INVENTION

The present invention relates to program planning, and more particularly to an improved device for displaying a program and its progress, where the program is constituted by at least three program factors and one of the program factors is common to all the other program factors.

Use of planning or programming systems is becoming increasingly important in the complex coordination of many industrial and other operations involving programs which require the coordination of a plurality of program factors, such as time, manpower, use of the manpower for making given products and doing given jobs, machinery or space for making these products or doing the jobs, etc. While computers may be successfully used to solve many of these problems, computer operation is expensive and, most importantly, some planning problems have not been amenable to solution by computers. This is particularly true for operations which are subject to interruptions and/or disturbances which require changes in the original plans to conform to the actual performance during the progressing operation.

In my copending U.S. Pat. No. 3,270,709, issued Sept. 6, 1966, I have disclosed a rectangular board for displaying a program consisting of two program factors.

It is an object of this invention to provide such a display device suitable for the most complex operations involving three or more program factors to be coordinated.

SUMMARY OF THE INVENTION

The above and other objects are accomplished in accordance with the invention with a rectangular support board defining a coordinate system of two mutually perpendicular axes. A plurality of parallel track means are arranged on the support and extend parallel to one coordinate axis, and each of the track means is in alignment with a visible indicium indicating one of the other program factors. A display of sequentially arranged indicia indicating one group of the one program factor is arranged on the support parallel to the one coordinate axis. The groups of the other program factors define a corresponding number of dimensions parallel to the coordinate axis perpendicular to the one coordinate axis. Indicator means are slidably mounted on the track means. Each indicator means is of the same width as each unit for alignment with a respective unit along a respective perpendicular coordinate axis, and each indicator means displays an indicium indicating an interrelationship between the other program factors. A plurality of elongated indexing members is capable of being positioned on the support means across the track means in alignment with selected units.

In the illustrated and preferred embodiments, the one group of program factors is time units.

In one preferred factor, two track means are associated with each other program factor one track means indicating a planned program and the other track means indicating an actual program as it progresses.

According to one feature of the present invention, the elongated indexing members comprise a first group of flexible elements, such as wires, detachably mounted on the support means and a second group of cursor rods slidably mounted on the support for movement in the direction of the one coordinate axis.

BRIEF DESCRIPTION OF DRAWING

The above and other objects, advantages and features of this invention will become more apparent from the following detailed description of certain now preferred embodiments of a display device and its possible uses in programming, taken in conjunction with the accompanying drawing wherein FIG. 1a is a plan view of one embodiment displaying a non-repeating industrial production program;

FIG. 1b is a similar view of the same display board showing another program;

FIGS. 2a and 2b are respective sections along lines IIa–II and IIb–IIb of FIGS. 1a and 1b;

FIG. 3 is a plan view of a modified board displaying a repeating program;

FIG. 4 is a section along line IV—IV of FIG. 3;

FIG. 5 is an enlarged view of an indicator element preferred for use in the display board and program of FIG. 3;

FIG. 6 is a top view of FIG. 5 also showing indicia on the indicator element;

FIG. 7 is a section along line VII—VII of FIG. 5;

FIG. 8 is a plan view of another embodiment of the display board;

FIG. 9 is a section along line IX—IX of FIG. 8;

FIG. 10 is a top view of FIG. 8;

FIG. 11 is a plan view of yet another embodiment of the display board;

FIG. 12 is a section along line XII—XII of FIG. 11; and

FIG. 13 is a top view of FIG. 11.

DETAILED DESCRIPTION

To obviate redundancies in the description of the preferred embodiments illustrated in the drawing, like reference numerals designate like parts operating in an equivalent manner in all figures.

Referring first to FIGS. 1a, 2a and 1b, 2b showing one embodiment of the programming and planning system of the present invention applied to two different programs, there is illustrated a planning or programming board comprising a frame 10 housing a base or display portion which carries three different groups of program factors A,41, B,42 and C,43 which are coordinated with a fourth and common group of program factors 16.

In the illustrated programs, the production of a number of different articles, i.e., cog wheels A1, shafts I of one type A2, shafts II of another type A3, end pieces A4 and metal sheets A5, by a number of different workers, i.e., Mr. Anderson B1, Mr. Patterson B2 and Mr. Smith B3, on a number of different machines, i.e., lathe C1, planning machine C2, grinding machine C3 and drilling machine C4, is to be programmed.

For the sake of simplicity of illustration, the system has been limited to the four groups of program factors hereinabove described but it will be obvious to those skilled in the art that other factors may be readily added in a like manner to take into consideration also such variables as available means of transportation, i.e., a number of trucks, etc.

As will be apparent from the drawing, a plurality of horizontally extending, i.e., unidirectonal, track members 1, 1a are mounted on the base portion of the system, one pair of track members 1, 1a being associated with each item of each program factor, and the track members being vertically spaced from each other. Indicator elements 2, 2a are removably mounted on track members 1, 1a and are slidable for horizontal displacement on the respective track members. The indicator elements 2 in horizontal rows P are associated with a planned program of production and the indicator elements 2a in horizontal rows V are associated with an actual production program.

The two indicator elements associated respectively with a planned and an actual program carry indicator members 5 and 5a, respectively, which are visually distinctive from each other, i.e., of different color. The indicator members are either integral with, or may be attached to, the indicator elements. The indicator members display such indicia as combinations of letters or figures, for example the illustrated combination of figures 01, 02, 03, etc., to indicate certain states and relationships of the program, as will be explained more fully hereinafter, or symbols, for example a circle to indicate the start of an operation, or an arrow indicating the end of an operation, thus showing the duration of the operation, for instance the duration of time during which a certain resource is utilized.

Special indicator members are provided with indicia to display special conditions, such as indicator member 30 showing a cross hatched face indicating overtime hours which should normally not be used; 31 showing an X mark indicating a resource, such as a man or machine, not being used; 32 (FIG. 3) indicating a program factor item not to be used at a certain time, etc.

The programming and planning system further comprises a plurality of vertically extending, i.e., unidirectional, indexing members 4, 4a mounted on the frame, one set of horizontally spaced indexing members 4 being associated with the planned program and another set of horizontally spaced indexing members 4a being associated with the actual program. All indexing members are movable into registry with selected indicator members and time units of the time program factor 16.

In cooperative association, the indicator members and the indexing members constitute program indicating means. The indicating means members are positionable in planes parallel to each other and to the plane of the base or display portion of the system.

In the embodiment illustrated in FIGS. 1a and 1b, each indexing member 4 includes a flexible elongated element or wire having one end attached to a shaft 20 mounted on bracket 9 extending along the top of frame 10. The one end of the wire passes through an eyelet 21 and is trained over a pair of rods 23 and 24 mounted at the top of the base or display portion, each wire being guided in a respective circumferential groove 23', 24' in the rods 23, 24. A hook 22 (or like attachment member) is connected to the other end of each wire for removable engagement with an elongated bar 27 at the bottom of the base or display portion. Each eyelet 21 is attached to one end of a coil spring 18 whose other end is attached to bracket 19 at the bottom of frame 10.

The common program factors 16 are time factors common to the entire program and includes a plurality of horizontally spaced indicator members showing consecutive units. Selected indexing members 4 may be brought into registry with selected time units of the program factors 16 simply by pulling down the selected member 4 and attaching its hook 22 to bar 27, the member being kept under tension by spring 18 biased to pull down eyelet 21. As will be explained more fully hereinafter, selected ones of the indexing members 4, of which each is associated with a respective indicator member or time unit of the common program factors, are moved into registry with the associated time unit when there is a relation in the program between the time unit and another program factor whose vertically aligned indicator member is then also and automatically in registry with the selected indexing member.

The indexing members 4a are cursor members or rods horizontally displaceable in a plane parallel to the plane of the indexing members 4 and that of the base or display portion of the system. They are operable independently of indexing members 4a. Two alternative arrangements for displaceably mounting the cursor members 4a are shown in the drawing.

In the mounting arrangement illustrated in FIGS. 1a, 2a, 1b, 2b, the cursor members are rods whose ends are attached to runners 28, 28 which slide along upper and lower trackways 6 which extend along the length of the frame 10 so that each cursor member may be horizontally displaced into registry with a selected group of vertically aligned indicator members of the programs factors.

In the mounting arrangement of FIGS. 8 to 10, all actually used cursor members 4a may be moved in unison. As shown, a pair of endless conveyor belts 80, 81 are each mounted on a pair of pulleys 82, 82 for movement in a direction parallel to the direction of extension of the indicator members of the program factors, i.e., horizontally. The pulleys are fixedly mounted on parallel shafts 84, 85 extending perpendicularly to the direction of extension of the indicator members, i.e., vertically, the shafts being mounted in bearings in frame 10 on each side thereof in a plane parallel to the plane of the base or display portion of the system. The conveyor belts are arranged to move in guides or trackways 92, 93, respectively, which are secured to the top and bottom of frame 10. A knob 86 is rotatably mounted on the frame at one side thereof adjacent to one of the shafts supporting the pulleys 82, this being shaft 84 in the illustrated embodiment. A gear 87 is keyed to shaft 84 and a meshing gear on the rotatable shaft of knob 86 cooperates therewith so that, upon rotation of the knob, shaft 84 is rotated to move the conveyor belts 80, 81 synchronously. 89, Each conveyor belt is divided into a plurality of units, each belt unit having a respective aperture 88, horizontal the apertures in each conveyor belt being equidistantly spaced and the aperture spacings being preferably equal to the horizontal spacings of the indicator members of the common program factors 16. In the illustrated embodiment, the apertures are conical to receive support pins 90, 91 for the cursor members 4a, the support pins having wedge-shaped ends for tight insertion into the conical apertures and holding respective cursor members 4a secured thereto so as to span the vertically aligned indicator members of all program factors. The trackways 92, 93 hold the conveyor belts in position and also prevent belt damage or breakage by maintaining pressure on the belts within prescribed limits when the cursor member supporting pins 90, 91 are inserted into, or removed from, belt apertures 88, 89.

The indexing members 4 and 4a, in cooperation with the indicator members, contribute to making visible the mutual relationships between the different program factors, including the time units. Referring, for instance, to FIG. 1a, the first indexing wire 4 shows that the cog wheel in the planned program P, which is indicated by indicium 01 on the indicator member 5, is handled during the 1st hour (see the vertically aligned time unit of program factors 16) by Mr. Anderson (B1, P, 01) who operates the lathe (C1, P, 01). Thus, the indexing member 4 visibly interconnects the coordinated indicator members 5 or the indicator elements 2.

Similarly, the indexing members 4a are used for visible indicating the mutual relationships between the different program factors in the actual program V. When delays occur, they will readily show where.

The indexing wires 4 may have different colors for different hours or days to be indicated. The cursor members 4a may be correspondingly colored so that it is easy to identify to which "planned" hour any particular time delay corresponds, such delay being shown by a lateral displacement of the corresponding cursor member 4a.

The dots and arrows on the indicator members 5 and 5a respectively indicate the start and stop of various part operations. Thus, when a certain operation designated 01 during a certain hour is to be connected only with program factors A1, B1, etc., two oppositely pointed arrows may be positioned on respective members 5 and 5a. Thus, the dots and arrows will make readily visible certain port operations.

In some cases, it is important that the indicator elements, particularly the elements 2 associated with the program in horizontal rows P, remain in registry with the associated indexing members 4. FIGS. 5 to 7 illustrate an embodiment of indicator element 2 serving this purpose.

In this embodiment, the indicator element 2 has a track 50 projecting from the indicator element in the same direction as the indicator member thereon. When an indexing member 4 is moved into registry with the indicator element, it will engage the track 50 thereof so that the two will be automatically keyed for a part of the programming if the indicator elements at the start and the end of this programming part have these tracks.

In the preferred embodiment illustrated herein, the height of shank 51 of the track 50 is such that the indicator elements 2 and the indexing members 4a for the actual program could be moved unimpeded by the members 4 for the planned program.

The function of the programming system according to FIGS. 1a and 2a will now be described in connection with one specific example, it being obvious that the present invention is not in any way limited to the specific examples provided herein merely for the purposes of illustration and explanation.

In this example, it is desired to manufacture or handle four articles, i.e., cog wheels A1, shafts I A2, shafts II A3, and pieces A4, and metal sheets A5, these articles constituting a first group of program factors 41. The second and third group of program factors 42 and 43 are constituted by the available resources, i.e., available machine operators B1, B2 and B3, and available machines C1, C2, C3 and C4. These program factors are all coordinated with common program factors 16, i.e., the time.

The technological sequency and processing times in hours ($h$) for making the various articles are as follows:

| Job A1 | Job A2 | Job A3 | Job A4 | Job A5 |
|---|---|---|---|---|
| turning 2$h$ | drilling 6$h$ | grinding 6$h$ | drilling 1$h$ | drilling 1$h$ |
| planing 4$h$ | planing 5$h$ | turning 5$h$ | planing 3$h$ | |
| grinding 5$h$ | turning 2$h$ | planing 2$h$ | | |
| drilling 1$h$ | grinding 3$h$ | drilling 2$h$ | | |

Operator B1 can operate the lathe and planing machines. Operator B2 can operate the planing and grinding machines. Operator B3 can operate the grinding and drilling machines.

The programming board is to be used to establish an optimal program to complete the work in a minimum total time with maximum utilization of the operators, taking into account the possibility of stochastic disturbances, such as machine breakdowns.

The complexity of solving the above problem will be appreciated from the fact the mathematical (algebraic-analytical) methods of solution are known only for the following cases:

1. $n$ jobs and two machines C1 and C2; all jobs process in the order C1, C2.
2. $n$ jobs and three machines C1, C2 and C3; all jobs processed in the order C1, C2, C3, with certain limitations. 3. two jobs and m machines; each job to be processed through the machines in a prescribed order which is not necessarily the same for both jobs.

A graphic method is also available for case (3). However, it has been found that, in most cases, mathematical (computer) methods are not suitable for practical programming of such involved type, and they are definitely not useful for the program described above. With the aid of the present programming board, however, it is readily solved and without any expertise in mathematics, as will now be described.

For purposes of the present example, the jobs, i.e., program factors 41, are selected as the leading concept or factors of the program. Thus, use is made of the indicator members which display the indicia 01 for job A1, 02 for job A2, 03 for job A3, 04 for job A4, and 05 for job A5.

The respective indicator members 01 for job A1 are now inserted on the indicating elements of rows P in program factors 43 for the planned use of the machines. Thus, for machine C1, indicator members for 2 hours (job A1 requiring 2 hours of turning), i.e., indicator members displaying the indicia 01, are inserted on the indicating elements vertically aligned with the indicator members of common program factors 16, which display the indicia 1 and 2, respectively, to indicate the first 2 hours of the 1st day (each of the program days being divided into 10 hours in the illustrated example). The following four hours of the 1st day are indicated also with the indicator members displaying indicia 01 for planing machine C2, the following 5 hours i.e., the last 2 hours of the first 8 hour working day and the first 3 hours of the second working day, are similarly indicated with the indicator members 01 for grinding machine C3, and the succeeding, 4 th hour of the 2nd working day is likewise indicated with an indicator member 01, which completes job A1, i.e., the leading program factors, on the machines C of the program factors 43.

The final program factors 42 are that of assigning the three operators B to running the respective machines. For example, operator B1 is assigned to run machine C1 for the first 2 hours of the 1st day and, for the succeeding 4 hours, he is assigned to machine C2, this being indicated by placing indicator members displaying the figures 01 in row P of B1. Subsequently, operator B3 is assigned to machine C3 for the succeeding 5 hours of the program, and finally to machine C4 for 1 hour.

By observing the display of the indicator members 01 assigned to job A1 in rows P (planned program) of the planning board, it will readily be seen that grinding and drilling machines C3 and C4 are free during the first 6 hours of the first working day while job A1 proceeds, which makes it possible to start jobs A3 and A2 to which the indicator members displaying the figures 03 and 02 are assigned. During this period, operators B2 and B3 are also available as will be seen by a glance at the board. Accordingly, job A2 is allocated to operator B3 for the first 6 hours of the first day when job A2 is processed on machine C4, the indicator members displaying the figures 02 being placed in the respective rows P in vertical alignment with the indicator members 1 to 6 of the first day of common program factors 16. Simultaneously, job A3 is assigned to operator B2 who processes the job on machine C3 for the first 6 hours of the 1st day, as shown by the like placement of the indicator members displaying the indicia 03.

At the 7th hour of the first day of the planned program there are some shifts in assignments. At this time, operator B1 starts job A3 on machine C1, B2 processes job A2 on machine C2, and B3 runs job A1 on machine C3.

As shown in FIG. 1a and as will be readily understood by those skilled in the art, the planned program is completed accordingly in this manner to produce an optimal program making full use of the operators during the entire working time and without any delay in the production, as an inspection of the indicator members in program factors 41 and 42 will show.

This planned program will, of course, proceed according to plan only if no disturbance occurs in any of the program factors. The occurrence of a disturbance of the stochastic type, such as a machine breakdown, will produce an actual program which differs from the planned program. Therefore, it is of great practical importance to display the planned and the real program step by step so that the planned program may be readjusted to the real program by taking into account the effects of certain stochastic disturbances which will have a multiplier effect unless the planned program is promptly readjusted.

Therefore, the planning board of the present invention provides for two rows of indicator members for each item of the program factors, the real program being displayed in rows V by the appropriate indicator members placed there in accordance with the progress of the program.

Thus, referring to FIG. 1a, it will be seen that during the third hour of the 1st day (days 1, 2, etc. each being sub-divided into 10 working hours in program factors 16) machine C1 has broken down, causing a 1-hour delay in job A1. This delay will have the following consequences:

Job A2 will be delayed 1 hour on machine C2, causing operator B1 to be idle for an hour of day 2. Operator B3 will be idle for an hour, i.e., the 7th hour of day 1, because job A1 has not been completed in time on machine C2 by operator B2. All the jobs are shown to be delayed an hour, which means that jobs A2, A4 and A5 are completed the 1st hour of day 3.

This shows that, by the insertion of the indexing members at key points, it is possible quickly to find the multiplier effect of a disturbance and, since this can be done immediately upon the occurrence of such a disturbance, the future effect thereof may be minimized by prompt adjustment of the program.

It should be noted that the multiplier effect is normally greater than in the above example since the illustrated program has, for simplicity's sake, been illustrated in connection with relatively few resources and activities, and is of short duration.

A replanned program is shown in FIG. 1b where the effect of the disturbance has been reduced. For the sake of simplicity, an overtime hour has been used for carrying out job A2 on machine C2 to allow completion of all jobs by the 8th hour of day 2 and full use of all the operators at all times.

Since operators B1 and B2 can use machine C2, either one could be doing the overtime job but operator B1 has been designated to work the 9th hour of day 1. Operator B2 processes job A1 on machine C2 (7th hour of day 1) so that operator B1 may be able to start job A3 as originally planned. Job A4 is shifted in time from the 5th hour of day 2 to the 7th hour of day 1. From the 4th hour of day 1 the program runs as shown in FIG. 1b. If new disturbances occur, they may be similarly indicated readily for a rapid followup in replanning the operation.

FIG. 3 shows the programming system applied to a repeating schedule, such as weekly school schedules which are the same week after week during an entire school semester or year. In such cases, it is normally not necessary to take into consideration a planned and an actual program.

The program factors A,411 refers to teachers, wherein A1 designates teacher No. 1, A2 teacher No. 2, etc. Program factors B,421 refers to class rooms, herein B1 designates class room No. 1, etc. Program factors C,431 refers to classes, wherein class C1 designates class No. 1, etc. Finally, program factors D,441 refers to subjects to be taught these classes, wherein subject D1 designates subject No. 1 (say, Swedish); D2, say, English; D3, say, German; D4, say, mathematics; and D5, say, physics, etc.

For the purpose of the present example, the classes, i.e., program factors 431, are selected as the leading concept or factors of the program. Thus, use is made of the indicator members which display the indicia 01 for class No. 1, 02 for class No. 2 (C2), 03 for class No. 3 (C3), etc.

From available data, it is known that the 5th hour of each day is lunch hour (i.e., no classes are held), that classes Nos. 1 and 2 (C1 and C2) are taught every other hour of the school day and class No. 3 (C3) starts the 2nd hour of day 1. It is now possible to indicate in program factors D which subjects are to be taught to the various classes according to the school's requirements. In the chosen examples, these requirements are the classes Nos. 1 and 2 will have 2 hours of Swedish (D1) on day 1, thereafter 1 hour of English (D2) and the following hour German (D3). The indicia 30 on the indicator members show the lunch hour. After lunch, class No. 1 will have 2 hours of mathematics (D4) and, finally, physics (D5).

Classes Nos. 2 and 3 are similarly scheduled, being shown on the indicator members by indicia 02 and 03, respectively, in the row of program factors D relating to the subjects to be taught in the classes.

Planning now proceeds by assigning teachers (program factors A, 411) to classes and subjects. This is a somewhat more complex operation than the assignment of class rooms and, in the present example, the teachers' assignments were handled before the class room assignments. This is started by placing indicator members 32 carrying visible indicia for each teacher A1 to A5 in vertical alignment with the hour of the day which they do not or cannot teach. Thereafter, the use of each teacher is indicated by indicator members with the corresponding indicia. In FIG. 3, it is seen that teacher No. 1 (A1) teaches Swedish (D1) to class No. 1 (C1) during hours 1 and 2 of day 1, indicator members with the indicia 01 being placed in vertical alignment with these hours and in horizontal alignment with A1, C1 and D1. Afterwards, as shown by the indicator members with indicia 02, he teaches Swedish to class No. 2 (C2) during hours 3 and 4 of day 1. He does not teach during the remaining hours of this day, as indicated by the fact that no indicator members are placed in alignment with these hours.

Teacher No. 2 (A2) teaches English (D2) to class No. 1 during the 3rd hour of day 1 and to class No. 3 (C3) during the 4th hour of day 1. During the bth hour, he teaches English to class No. 2 (C2); during the 6th hour he is free; and during the 8th hour he teaches Swedish (D1) to class No. 3 (C3). The other teachers' employment is similarly shown by corresponding indicator members in the horizontal rows aligned with the respective teachers (A1, A2, A3 . . . An) in program factors A, 411. After all assignments have thus been indicated, the employment of all the available teachers may be checked and, if needed, indicator members may be properly manipulated to obtain the optimum use of the teachers in the program.

The program is now ready for the allocation of classes, teachers and subjects previously assigned to the available class rooms. In some instances, there may be more class rooms available than classes to be assigned, which frequently leads to poor utilization of class rooms. For example, there may be 20 classes, 40 teachers and 50 subjects to be assigned to 40 class rooms, it being understood, however, that some class rooms, such as science laboratories, indicated by class room No. 5 (B5), can be used only for certain subjects. Therefore, it will be best to start the allocation of class rooms with these rooms of restricted use.

In the program factors C (classes) and D (subject), indicator members with indicia 02 show that class No. 2 (C2) will be in class room No. 5 (B5) during hours 1 and 2 of day 1, that this class room is not occupied during hours 3 to 6, that it is occupied by class No. 3 (C3) during the 7th hour and by class No. 1 (C1) during the 8th hour of day 1. After the special-purpose class rooms have thus been programmed, the programming for the utilization of the other class rooms starts.

After completion of all the class room allocations, a "vertical" check may be made. Thus, it will be seen by checking the vertical alignments of the respective indicator members that, for example, during the 2nd hour of day 1, class No. 1 (C1) is in class room No. 1 (B1), being taught subject No. 1 (D1) by teacher No. 1 (A1). During the 3rd hour, class room No. 1 is occupied by class No. 2 to whom teacher No. 1 teaches subject No. 1, and so forth. The program being much simpler than that encountered in industrial production, there is no need for the cursor indexing member 4a in this embodiment, nor for the indicia showing the start and finish of certain operations.

It will be apparent from the above example that the programming board of the present invention makes it possible to make up school time tables in a fraction of the time hitherto used for this purpose while, at the same time, making better use of the available resources. In addition, the program may be readily controlled since all the information is simultaneously visible on the board.

It is within the scope of this invention to make the track members 1 and/or the indicator elements 2 and the indicator members 5 magnetic so that the indicator members and/or the indicator elements may be magnetically held on the board of FIG. 3. Alternatively, the indicator members may be small cards and the indicator elements may be card holders on which the cards with suitable indicia may be detachably mounted.

For ready visibility, the vertically extending indexing members 4 could be replaced by a color code. For example, all indicator members used for the 1st hour of day 1 (i.e., being vertically aligned) may have a yellow face, in addition to showing the appropriate indicia, those used for the 2nd hour may be green, etc. However, the provision of a vertical index member visibly aligning all indicator members in a vertical row aligned with a time unit of program factor 16 is preferred because of its simplicity.

In the embodiment of FIGS. 11 to 13, there is added a group of program factors 116 to indicate the time for the actual program, in addition to the program factors 16 which indicates the time for the planned program. The indicia indicating the time units for the actual program are mounted on a belt which is trained over wheels 182, 182 mounted on shafts 184, 185 rotatable by knob 186 operating gear train 187 on shaft 184. With this arrangement, the time scale 116 may be moved at each change of date. In the illustrated example, for instance, the indexing members 4 and 4a show that a process A1, planned for completion by January 10, is actually finished on February 9.

It will be understood that the specific structures herein described and illustrated are given merely by way of example and that they may be readily modified by those skilled in the art without departing from the spirit and scope of the present invention as defined in the appended claims.

I claim:

1. A device for displaying a program and its progress, the program being constituted by respective program factors of at least three groups of different types of program factors and one of said groups of program factors being common to all the other program factors, said device comprising
   1. a rectangular support means having two coordinate axes perpendicular to each other,
   2. a plurality of track means structurally integral with the support means and extended parallel to one of the coordinate axes,
   3. indicator means of identical width slidably mounted on the track means,
      a. each of the indicator means having replaceably mounted thereon a respective visible indicium,
      b. respective groups of said visible indicia indicating respective ones of the other program factors,
      c. the visible indicia indicating the different types of program factors being arranged parallel to the coordinate axis perpendicular to the one axis, and
      d. the indicia indicating an interrelationship between the different types of the other program factors,
   4. one group of sequentially arranged indicia indicating the one program factor common to the other program factors,
      a. said sequentially arranged indicia being mounted on the support means parallel to the one coordinate axis, and
      b. the visible indicia indicating the different types of the other program factors being in alignment with respective ones of the sequentially arranged indicia, and
   5. a plurality of elongated indexing members each corresponding to a respective one of the sequentially arranged indicia and replaceably positioned on the support means across the track means parallel to the perpendicular coordinate axis and in alignment with selected ones of the indicia indicating the other program factors.

2. The device of claim 1, wherein the one program factor is time and the sequentially arranged indicia indicate units of time.

3. The device of claim 1, wherein two of said track means are associated with each of the other program factors, the indicia on the indicator means on one of the two track means indicating the interrelationship between said other program factors in a planned program and the indicia on the indicator means on the other one of the two track means indicating said interrelationship in an actual program.

4. The device of claim 1, wherein the indicator means are removably mounted on the track means.

5. The device of claim 1, wherein the elongated indexing members comprise a first group of flexible elements detachably mounted on the support means and a second group of cursor rods slidably mounted on the support means for movement in the direction of the one coordinate axis.

6. The device of claim 5, wherein each of the flexible elements has two ends, guide means on the support means for guiding each of the flexible elements adjacent one of the ends thereof, spring-biased means for fixedly attaching the one flexible element ends to the support means, and means for detachably attaching the other flexible element ends to the support means.

7. The device of claim 5, further comprising a pair of tracks on the support means and parallel to the one coordinate axis, the cursor rods being slidably supported on said tracks.

8. The device of claim 5, wherein each of the cursor rods has two ends, a pair of conveyor belts mounted on the support means for movement in a direction parallel to the one coordinate axis, said conveyor belts defining equidistant apertures for respective alignment with respective one program factor, and the ends of the cursor rods being removably mounted in respective one of the apertures.

9. The device of claim 1, wherein at least some of the indicator means have trackways parallel to the perpendicular coordinate axis and arranged to receive and guide respective one of said indexing members.

* * * * *